United States Patent
Maricevic et al.

(10) Patent No.: US 11,303,380 B2
(45) Date of Patent: *Apr. 12, 2022

(54) STRIPING OF SIGNAL TO GROUPS OF NODES FOR FLEXIBLE SERVICE GROUP SIZING

(71) Applicant: ARRIS Enterprises LLC, Suwanee, GA (US)

(72) Inventors: Zoran Maricevic, West Hartford, CT (US); Kevin P. Orazietti, Chester, CT (US); Hui Fang, Northborough, MA (US); John O. Caezza, Farmington, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,096

(22) Filed: Jul. 28, 2020

(65) Prior Publication Data

US 2020/0358549 A1   Nov. 12, 2020

Related U.S. Application Data

(63) Continuation of application No. 16/161,837, filed on Oct. 16, 2018, now Pat. No. 10,735,130.

(Continued)

(51) Int. Cl.
*H04J 14/00* (2006.01)
*H04J 14/02* (2006.01)
*G02B 6/293* (2006.01)

(52) U.S. Cl.
CPC ........ *H04J 14/0282* (2013.01); *G02B 6/2938* (2013.01); *H04J 14/02* (2013.01);

(Continued)

(58) Field of Classification Search
CPC ...... H04B 10/27; H04B 10/40; H04B 10/506; H04J 14/02; H04J 14/0298; H04J 14/0282;

(Continued)

(56) References Cited

U.S. PATENT DOCUMENTS 8,335,432 B1   12/2012   Darcie et al.
8,417,117 B2   4/2013    Smith et al.

(Continued)

OTHER PUBLICATIONS

"Fiber Optics: How Fused Fiber Optic Couplers Work", Photonics Technical Note #25, Fiber Obtics, downloaded from https://www.newport.com/medias/sys_master/images/images/h86/hb2/8797287088158/Tech-Note-26-How-Fused-Fiber-Optic-Couplers-Work.pdf on Oct. 9, 2018, 4 pages.

(Continued)

*Primary Examiner* — Hanh Phan
(74) *Attorney, Agent, or Firm* — Chernoff, Vilhauer, McClung & Stenzel, LLP

(57) ABSTRACT

In one embodiment, a first group of splitters receives a group of signals from a group of transmitters. Each splitter in the first group of splitters splits a signal into a plurality of signals that are sent to a plurality of multiplexers. A multiplexer in the plurality of multiplexers receives one of the plurality of signals from each splitter in the group of splitters and multiplexes the received one of the plurality of signals into a multiplexed signal. The multiplexer sends the multiplexed signal through a single connection in which upstream signals are sent to a group of nodes and downstream signals are received from the group of nodes. A de-multiplexer de-multiplexes the multiplexed signal into the group of signals and sends the group of signals to the group of nodes via a second group of splitters that are connected to the group of nodes.

20 Claims, 15 Drawing Sheets

Related U.S. Application Data

(60) Provisional application No. 62/572,899, filed on Oct. 16, 2017.

(52) U.S. Cl.
CPC ...... *H04J 14/0234* (2013.01); *H04J 14/0298* (2013.01); *H04J 14/0221* (2013.01)

(58) Field of Classification Search
CPC ............... H04J 14/0246; H04J 14/0247; H04J 14/0252; H04J 14/0234
USPC ...... 398/66, 67, 68, 69, 70, 71, 72, 100, 79, 398/158, 159, 82, 160, 141, 91, 93, 94, 398/81, 135, 136, 182, 138
See application file for complete search history.

(56) References Cited

U.S. PATENT DOCUMENTS

| | | |
|---|---|---|
| 9,749,080 B2 | 8/2017 | Lam et al. |
| 10,735,130 B2 * | 8/2020 | Maricevic ........... H04J 14/0234 |
| 2014/0186040 A1 | 7/2014 | Fujiwara et al. |
| 2018/0123693 A1 | 5/2018 | Yang |

OTHER PUBLICATIONS

John Ulm, "Traffic Engineering in a Fiber Deep Gigabit World", 2017 Fall Technical Forum, SCTE-ISBE Expo 2017, Oct. 17-20, 2017, 27 pages, Denver, CO.
PCT International Search Report & Written Opinion, RE: Application No. PCT/US2018/056088, dated Jan. 14, 2019.

* cited by examiner

STRIPING OF SIGNAL TO GROUPS OF NODES FOR FLEXIBLE SERVICE GROUP SIZING

CROSS-REFERENCES TO RELATED APPLICATIONS

The present disclosure claims priority to U.S. Provisional App. No. 62/572,899, entitled "SERVICE GROUP SIZE PHASING", filed Oct. 16, 2017, the contents of which is incorporated herein by reference in its entirety.

BACKGROUND

In network architecture upgrades, two criteria that are often considered and traded off one against another include: a) proper sizing of "service groups" to enable enough capacity to meet eventual customers' demand (even at the later stage of life of the proposed upgrade) and b) enabling a cost-effective start (e.g., with just the right amount of capacity to serve customers demand in the early stage of life). The networks are organized into "service groups" to which a certain bandwidth capacity is assigned to, both in downstream (DS) and upstream (US) directions. For example, a service group may start at 200 users or 400 homes passed (if it is assumed only 50% of homes passed may subscribe to the service). As the bandwidth capacity is expected to grow in time, the service groups may be split into additional service groups, such as two, four, eight, etc. service groups, to meet the growing demand. For example, the service group may be split into two service groups of 100, and then four service groups of 50. However, delaying those service group splits will save the cost needed to perform the "split" until the time the additional service groups are necessary.

A network may include 16 fiber deep (FD) nodes that may each feed a number of homes, such as 20-80 homes, via a single fiber link for both the downstream and the upstream directions. To transition to this type of network, a network provider may want to develop the network in phases. An end goal may be a maximum of eight dense wavelength division multiplexing (DWDM) downstream transmitters (TXs) and a maximum of 16 coarse wavelength division multiplexing (CWDM) upstream receivers (RXs). Also, the end goal may be two FD nodes per transmitter in the downstream and one FD node per receiver in the upstream. However, the network provider may convert the network using multiple phases before reaching the end goal.

A possible phase 1 configuration may be eight FD nodes per transmitter in the downstream and four FD nodes per receiver in the upstream. A possible phase 2 configuration may include four FD nodes per transmitter in the downstream and two FD nodes per receiver in the upstream. Changing from phase 1 to phase 2, and then to the end goal (e.g., phase 3) requires both head end and field changes. For example, at the head end, when the transmitter and receiver additions are made, the multiplexer in the head end upstream path needs to be replaced at every phase-to-phase conversion, such as from a four output CWDM de-multiplexer in phase 1 to an eight output CWDM de-multiplexer in phase 2, and eventually to a 16 output CWDM de-multiplexer in phase 3. The 4-CWDM and 8-CWDM de-multiplexers may not be standard de-multiplexers and may have to be custom-manufactured, which increases the cost.

In the field, in the downstream direction, splitters will require reconfiguration at each phase conversion. For example, phase 1 may require three levels of splitters; phase 2 will require two levels of splitters; and phase 3 will require only one level of splitters. This will require that a network provider go out into the field (e.g., truck rolls) to access the splitters and reconfigure the splitters in the field. The reconfiguration may also require service outages in addition to the cost for the service provider to go into the field.

DETAILED DESCRIPTION

Figure 1:
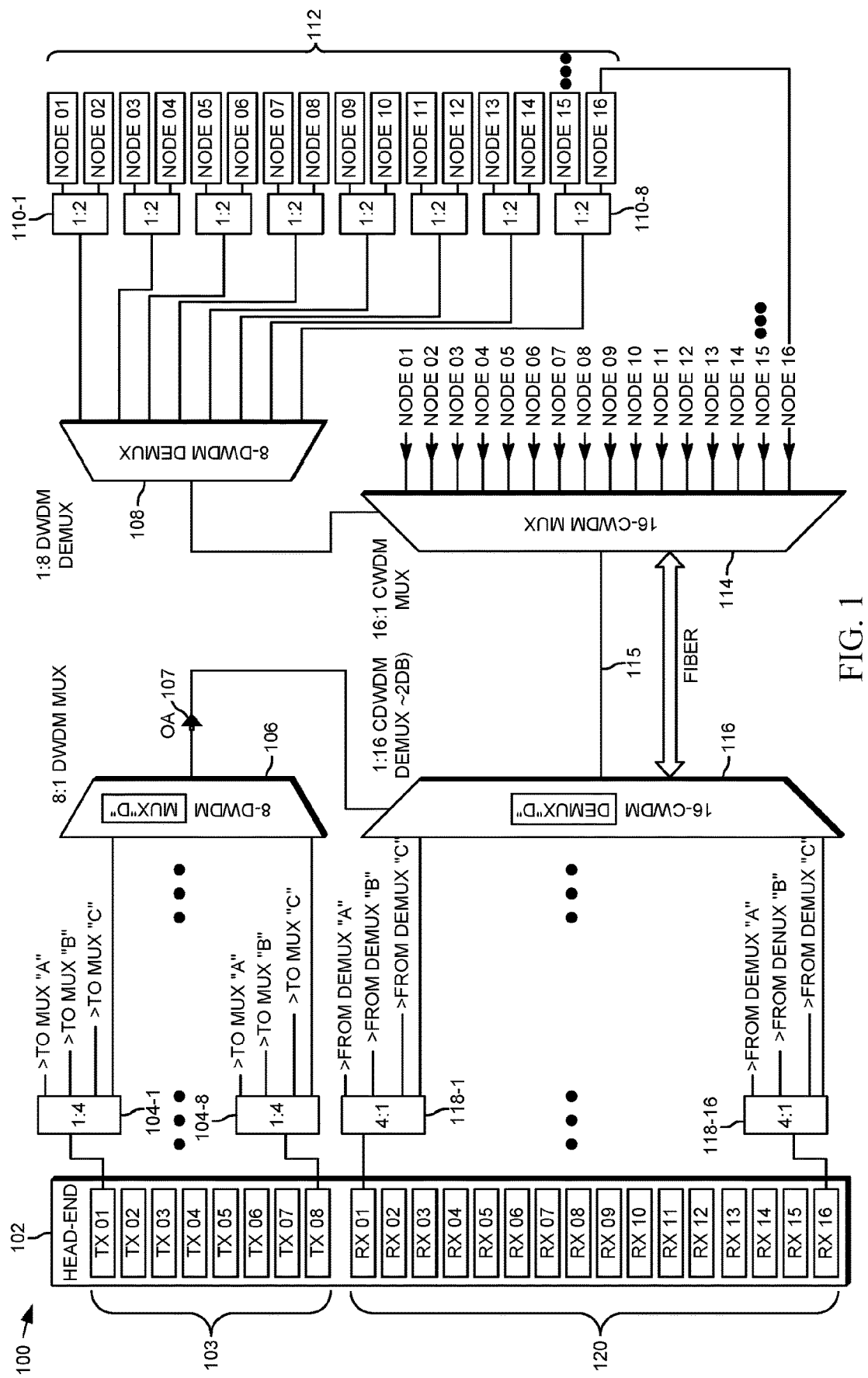
FIG. 1 depicts a simplified system showing a phase 1 configuration of a network according to some embodiments.

Described herein are techniques for a network communication system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

In a downstream direction, some embodiments split signals from downstream transmitters via a striping configuration on a per-wavelength basis at the head end side starting at a phase 1 configuration. Also, in an upstream direction, the signal may be combined via a striping configuration also. While the phase 3 configuration may be the same as that described in the Background, which is two fiber deep (FD) nodes per transmitter in the downstream direction and one FD node per receiver in the upstream direction, the configuration in phase 1 improves the conversion to phase 2, and also from phase 2 to phase 3. For example, the configuration in phase 1 eliminates the need to change the configuration in the field (e.g., components located after the fiber connection). For example, one level of splitters is used in the field in phases 1, 2, and 3, which eliminates the need to change the splitter configuration in the field when the configurations are changed in between phases.

The use of striping also allows the same 16 coarse wavelength division multiplexer (CWDM) de-multiplexer to use in all phases in the upstream direction. This eliminates need to use the 4-CWDM de-multiplexer and 8-CWDM de-multiplexer. Accordingly, the use of striping saves cost in that custom CWDM de-multiplexers do not need to be manufactured and changed.

Stripping Configuration

FIG. 1 depicts a simplified system 100 showing a phase 1 configuration of a network according to some embodiments. A head end 102 may transmit signals in a downstream direction to nodes 112 (e.g., signals destined for customer premise equipment) that are located remotely in "the field". The field may be located remotely from head end 102, such as after a fiber connection 115. Also, signals are transmitted in an upstream direction that originate at the customer premise, and travel upstream via nodes 112, to head end 102. The upstream and downstream directions may be served via a single fiber link 115 in both the upstream and downstream directions. That is, both the upstream signal and the downstream signal may be transmitted on the same fiber link. Other types of networks may also be used. There could be a dedicated/separate fiber to each downstream TX/node link and to each upstream Node/RX link. Also, all of the downstream and upstream links can go over the same fiber, as described herein. The fewer fiber strands means less cost, but is traded-off with cost/complexity of the de-multiplexers and multiplexers filtering. Other options use one fiber for all downstream signals and another fiber for all upstream signals, or to use a few fiber connections, with a fewer number of downstream wavelengths per fiber for downstream, upstream, and/or a combination of.

Each node may service a number of "homes passed" (HP) or "HouseHolds Passed" (HHP). The homes passed may be connected to the nodes, but some percentage of subscribers may subscribe to a service, such as subscribe to receive cable television service. The number of homes passed may be between 20 to 80 subscribers and the number of subscribers served by a set of nodes may be referred to as a service group.

In the downstream direction, head end 102 includes eight transmitters 103 denoted as TX 01 to TX 08 that transmit signals downstream. Also, 16 nodes 112 are shown as node 01 to node 16. These nodes may be fiber deep (FD) nodes, which are nodes located closer to subscriber premises where there are no amplifiers after the node (also called Node+zero (N+0)). In the upstream direction, 16 receivers 120, shown as RX 01 to RX 16, receive the upstream signals from nodes 112 in head end 102. In phase 1, all transmitters, nodes, and receivers are active.

In the downstream direction, a transmitter 103 may transmit a signal to a 1:4 splitter 104. For example, eight splitters 104-1 to 104-8 correspond, respectively, to the eight transmitters TX 01 to TX 08. Splitters 104 may split the signal into four signals that are destined for four different multiplexers. For example, each signal may be sent to a different 8-dense wavelength division multiplexer (DWDM) 106. That is, a single signal from transmitter TX 01 may be split by a 1:4 splitter 104 into four signals that are sent to four different 8-DWDM multiplexers A to D. Sending the signal to four different -DWDM multiplexers A to D stripes the signal to a different set of nodes. That is, the 8-DWDM multiplexer D shown in FIG. 1 may send a first signal that is destined for the set of 16 nodes 112. Then, a 8-DWDM multiplexer A (not shown) sends a second signal of the four signals to another set of 16 nodes, a 8-DWDM multiplexer B (not shown) sends a third signal of the four signals to another set of 16 nodes, and a 8-DWDM multiplexer C (not shown) sends a fourth signal to another set of 16 nodes. That is, a single signal from TX 01 may service four different sets of 16 nodes (e.g., 48 nodes in total). As described in the Background, just 16 nodes are connected with one set of multiplexers and de-multiplexers, but with only two transmitters being active. However, in some embodiments, by adding three more groups of 16 nodes, with set of multiplexers and de-multiplexers A, B, C, "striping" among the set of multiplexers and de-multiplexers A, B, C, and D to achieve the same ratio of eight nodes to a transmitter.

In FIG. 1, a single 8-DWDM multiplexer D 106 is shown that receives one of the signals from splitter 1:4 and multiplexes the signal with other signals from other transmitters into a single signal. For example, 8-DWDM multiplexer D 106 may multiplex a number of signals using different wavelengths into a signal for transmission over fiber connection 115. That is, 8-DWDM multiplexer 106 includes eight inputs to receive signals from eight transmitters and one output to output the multiplexed signal. The following will describe the signal communication for multiplexer D, but a similar signal communication may be appreciated for multiplexers A, B, and C.

8-DWDM multiplexer D 106 outputs the signal to an amplifier 107, which amplifies the signal. Although amplifier 107 is described, it may not be used if not needed.

A DWDM bypass port of 16-CWDM-channel de-multiplexer D receives the signal from amplifier 107 and then sends the signal over fiber 115 to a 16-CWDM multiplexer 114. The bypass port passes the signal through 16-CWDM de-multiplexer. In some embodiments, the signal does not need to pass through 16-CWDM de-multiplexer and additional fiber connections may be used to send signals. Fiber 115 may send signals in both the downstream and the upstream direction as described herein, but additional fiber connections may be used.

At the field side, 16-CWDM multiplexer 114 receives the signal and sends the signal to an 8-DWDM de-multiplexer 108, which de-multiplexes the signal to eight signals. For example, 8-DWDM multiplexer 108 includes one input and eight outputs to output eight signals that are de-multiplexed from the signal. Given that there are 16 nodes, 1:2 splitters 110-1 to 110-8 are used to split the eight signals from 8-DWDM de-multiplexer 108 into 16 signals, which are sent to nodes 01 to nodes 16. For example, a splitter 110-1 may split a signal to node 01 and node 02, and so forth.

In the upstream direction, at the field side, each node 01 to node 16 transmits a signal to 16-CWDM multiplexer D 114, which multiplexes the signals into a multiplexed signal onto fiber 115 to 16-CWDM de-multiplexer D 116. For example, 16-CWDM multiplexer 114 includes 16 inputs to receive signals from 16 nodes and one output to output the multiplexed signal.

16-CWDM de-multiplexer D 116 includes one input to receive the signal and 16 outputs to output the de-multiplexed signal. 16-CWDM de-multiplexer D 116 may de-multiplex a signal into 16 signals at different wavelengths. At 16-CWDM de-multiplexer D 116, different configurations to send the upstream signals from 16-CWDM de-multiplexer D 116 to receivers RX 01 to RX 16 may be appreciated. In this example, the upstream signals are sent to 4:1 combiners 118-1 t0 118-16, which also receive upstream signals from 16-CWDM de-multiplexers A, B, and C. Each 4:1 combiner 118 combines the signals from de-multiplexers A, B, C, and D into a single signal, and sends the signal to a receiver. For example, the signals from four different node 01s in groups A, B, C, and D are sent to receiver RX 01.

In the above, the configuration in the field does not need to be changed when the striping is changed when converting between different phases. That is, 1:2 splitters 110-1 to 110-8 are not reconfigured throughout all the phase changes, such as the number of 1:2 splitters, the number of levels of 1:2 splitters, or the connections of the 1:2 splitters to nodes are not changed. This improves the network because no down time in the field occurs and additional cost to reconfigure the splitters is not incurred by having to change the configuration in the field. Additionally, the 16-CWDM de-multiplexer D does not need to be changed when phases change. That is, the 16 output de-multiplexer stays the same, which improves cost as a 4-CWDM de-multiplexer and a 8-CWDM de-multiplexer are not used.

Specific numbers for the transmitters, nodes, multiplexers, de-multiplexers, splitters, and combiners are used. However, the numbers may be altered or scaled within some embodiments.

Phase 3 Example Network Configuration

Figure 2:
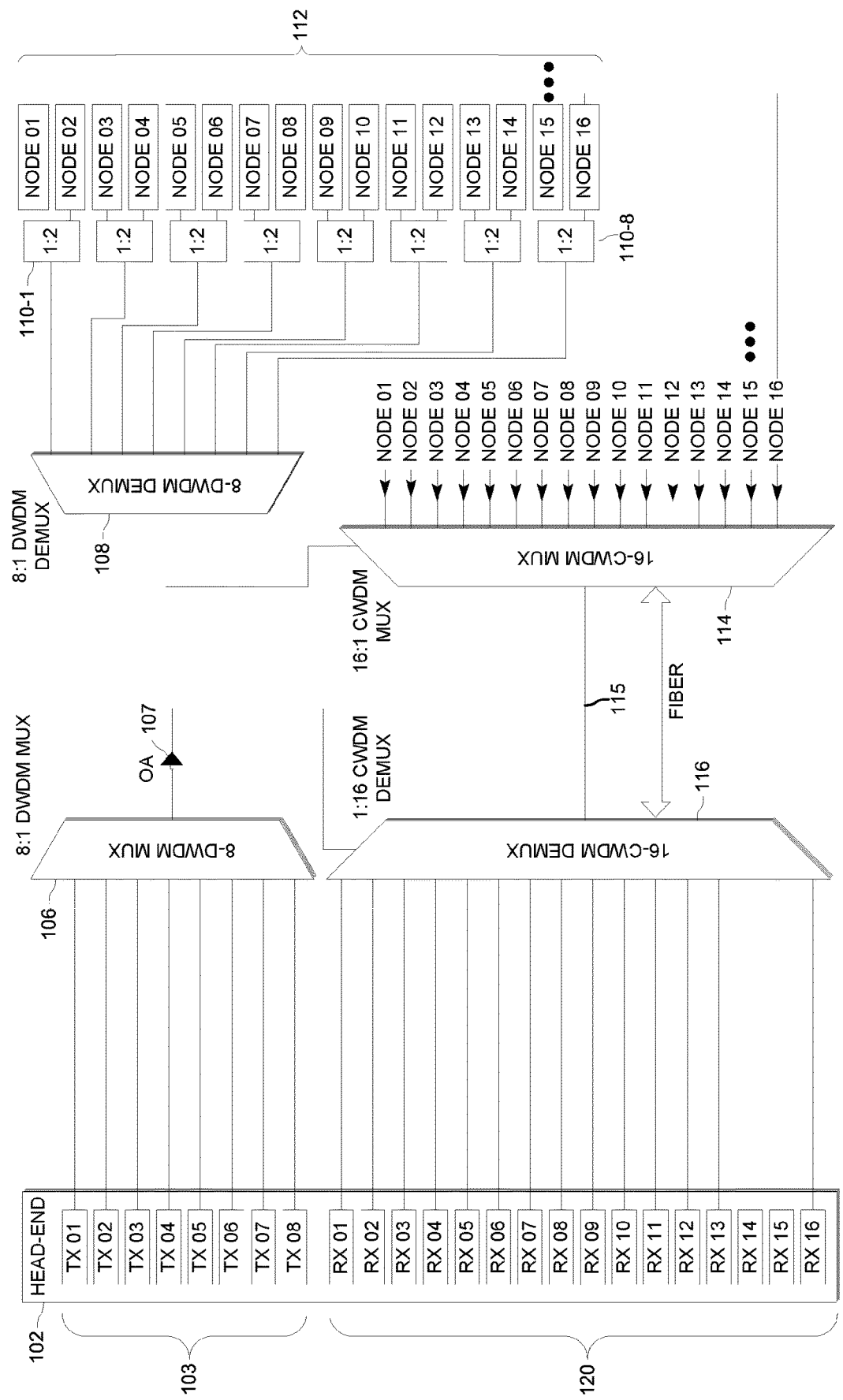
FIG. 2 depicts an example of the network configuration in phase 3 according to some embodiments.

FIG. 2 depicts an example of the network configuration in phase 3 according to some embodiments. In phase 3, as mentioned above, two FD nodes per transmitter are found in the downstream direction and one FD node per receiver is found in the upstream direction. As shown, splitters 110-1 to 110-8 remain the same from phase 1 to phase 3.

16-CWDM de-multiplexer 116 includes the same 16 outputs as in phase 1. However, the 16 outputs of 16-CWDM de-multiplexer 116 is 1:1 with receivers RX 01 to RX 16. That is, no combiners are needed unlike in phase 1. Additionally, transmitters TX 01 to TX 08 do not use a striping configuration. That is, each transmitter TX 01 to TX 08 sends a signal to 8-DWDM multiplexer 106. 8-DWDM multiplexer 106 then multiplexes the eight signals to a single output that can be sent on fiber 115 through 16-CWDM de-multiplexer 116. In phase 3, striping is removed and 16 nodes receive signals from eight transmitters. In the upstream, 16 nodes send signals to 16 receivers. The conversion changes from phase 1 in which four sets of nodes A, B, C, and D being serviced by the eight transmitters to phase 3 in which the four sets of nodes are now serviced by four different sets of 8 transmitters. Also, four sets of 16 nodes sending signals to a single set of 16 receivers in phase 1 now send signals to four different sets of 16 receivers in phase 3.

Striping

Figure 3:
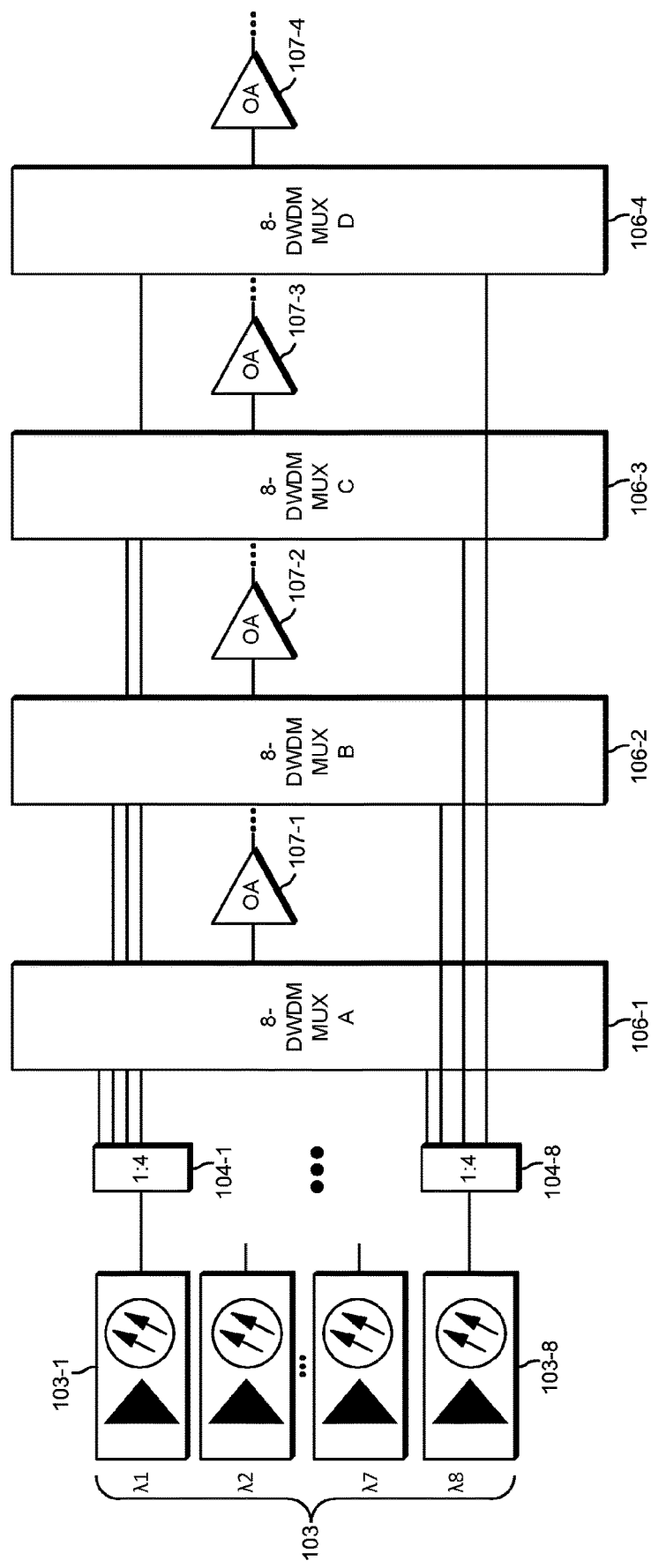
FIG. 3 depicts a more detailed example of striping in the downstream direction according to some embodiments.

FIG. 3 depicts a more detailed example of striping in the downstream direction according to some embodiments. Transmitters 103-1 to 103-8 may transmit at different wavelengths $\lambda 1$ to $\lambda 8$. The signals may be striped across four 8-DWDM multiplexers A, B, C, and D 106-1, 106-2, 106-3, and 106-4. For example, a transmitter 103-1 may transmit to a splitter 104-1, which splits the signal into four signals. A first signal is sent to 8-DWDM multiplexer A 106-1; a second signal is sent to 8-DWDM multiplexer B 106-2; a third signal is sent to 8-DWDM multiplexer C 106-3; and a fourth signal is sent to 8-DWDM multiplexer D 106-4. This is the forward stripping configuration where a single signal from a transmitter is striped to multiple 8-DWDM multiplexers that service different sets of nodes. Each 8-DWDM multiplexer may output a single signal to an amplifier 107-1 to 107-4, respectively. Amplifier 107 may be an erbium-doped fiber amplifier (EDFA), but may be other types of optical amplifiers, or not needed at all.

Figure 4:
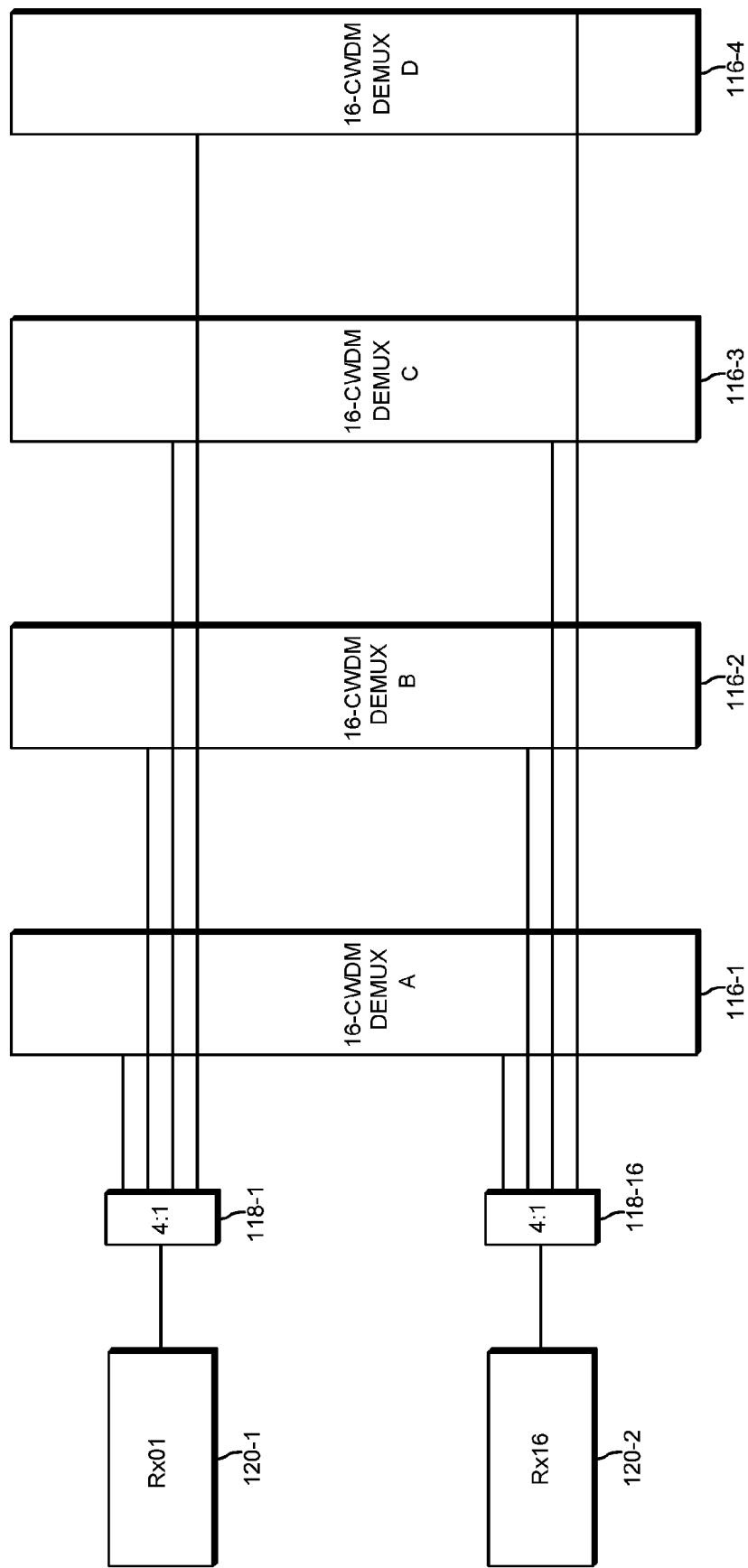
FIG. 4 depicts the striping in the upstream direction according to some embodiments.

FIG. 4 depicts the striping in the upstream direction according to some embodiments. Although this configuration of striping is described, other striping configurations in the upstream direction may be appreciated as will be described in more detail below. In this configuration, 16-CWDM de-multiplexers A, B, C, and D, 116-1, 116-2, 116-3, and 116-4 receive signals from four different sets of 16 nodes, respectively. A single signal from each of the four 16-CWDM de-multiplexer is then input into a 4:1 combiner, which then outputs the four signals via a single output to a receiver, such as combiner 118-1 outputs a signal to RX 01 120-1.

Figure 5:
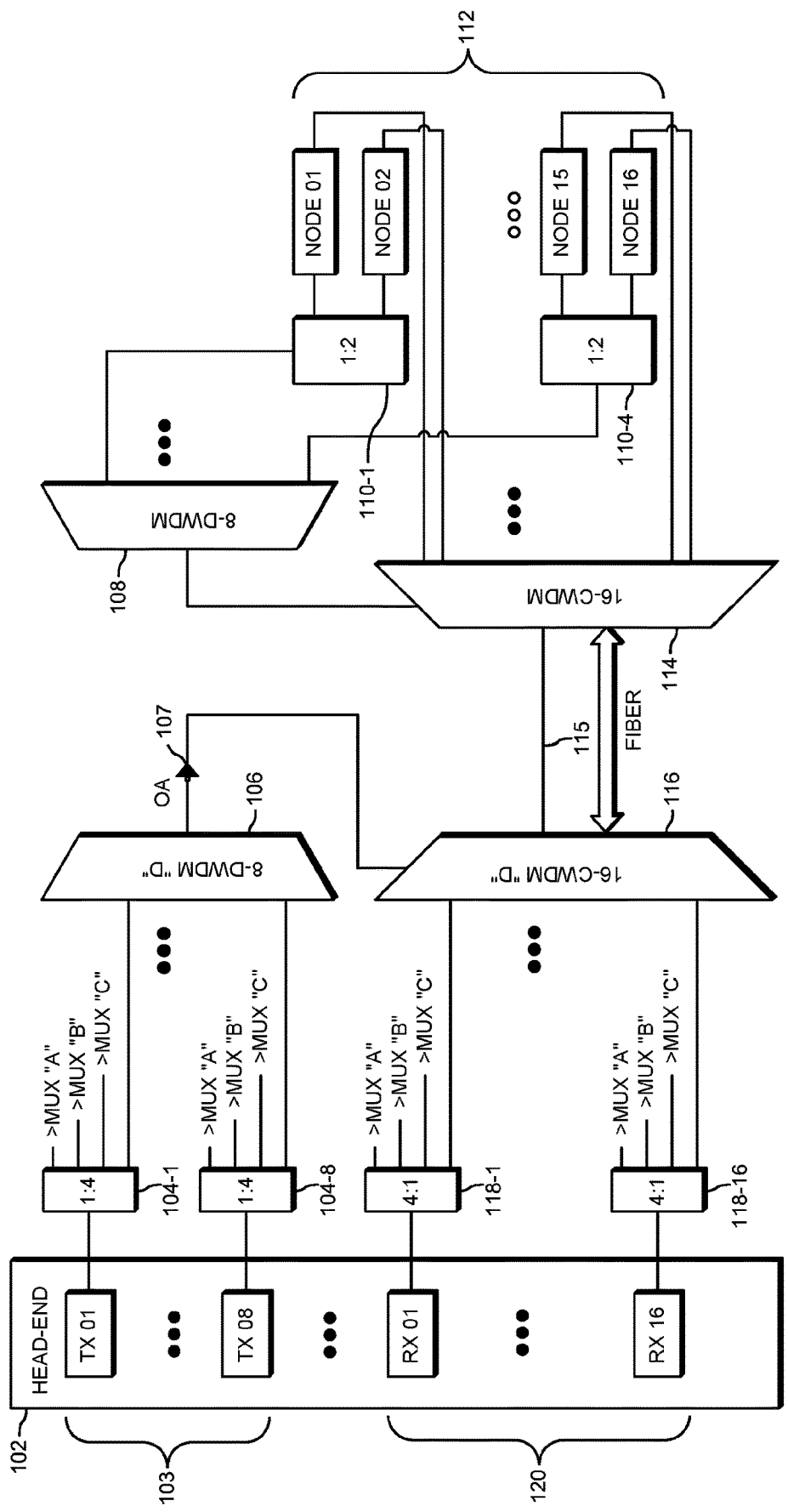
FIG. 5 depicts the striping in both the upstream and downstream directions where the same wavelength striping is used according to some embodiments.

FIG. 5 depicts the striping in both the upstream and downstream directions where the same wavelength striping is used according to some embodiments. This example is a more detailed example of the system shown in FIG. 1. For example, in this embodiment, the same wavelength signal from transmitters TX 01 to TX 08 is sent to 8-DWDM de-multiplexers A, B, C, and D in the downstream direction.

Figure 6:
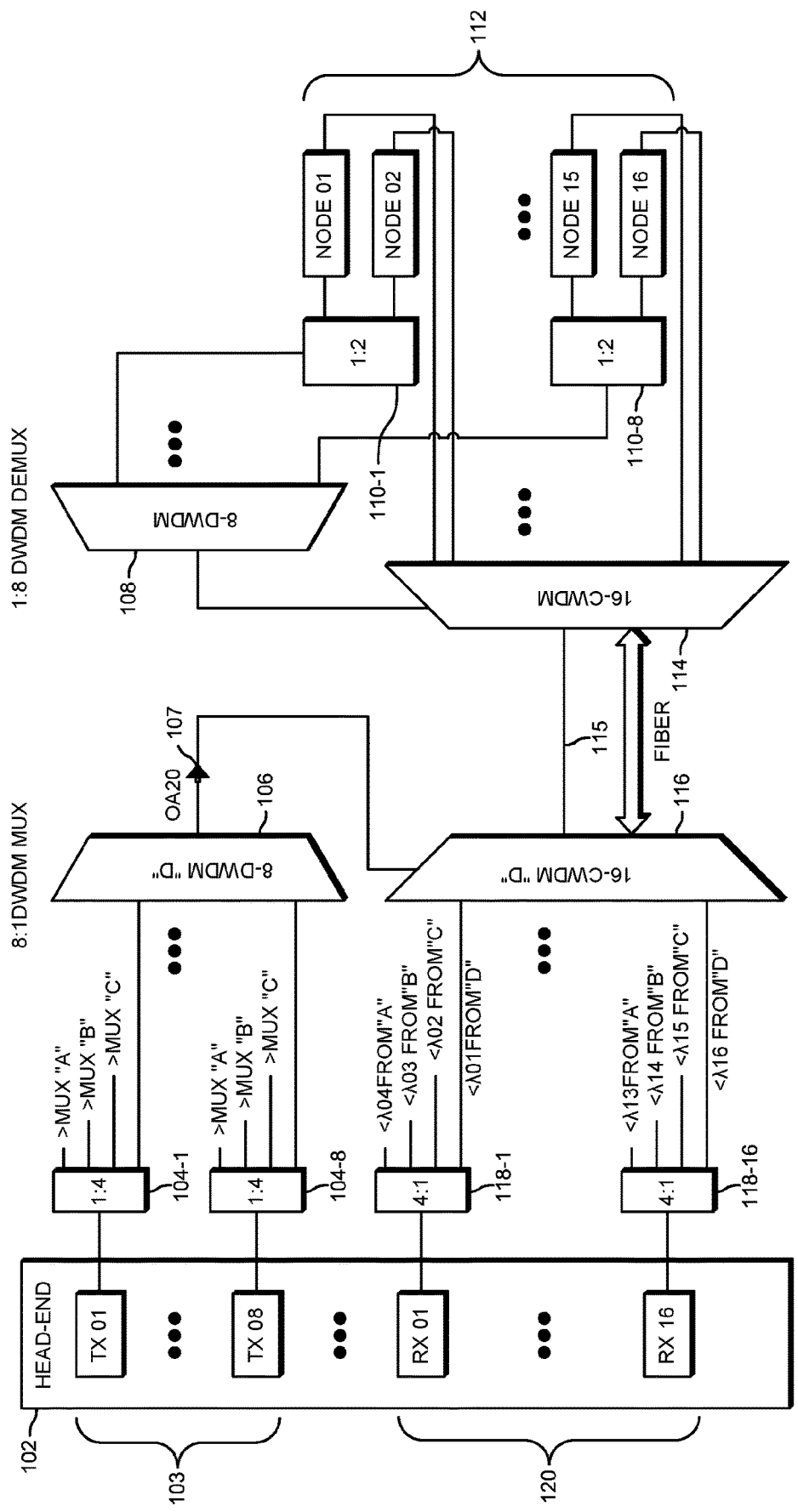
FIG. 6 depicts an example of using different wavelengths in the upstream direction according to some embodiments.

In the upstream direction, the same wavelength signals are sent to a 4:1 combiner 118. Sending the same wavelength from multiple nodes to a single receiver may result in interference, such as optical beat interference (OBI). Optical beat interference occurs when multiple transmitters transmit at the same wavelength to a single receiver at the same time and when a receiver receives the multiple signals at a similar wavelength at the same time. In some embodiments, to remove the possibility of any interference, different wavelengths from different 16-CWDM de-multiplexers A, B, C, and D are sent. FIG. 6 depicts an example of using different wavelengths in the upstream direction according to some embodiments. In some examples, a first wavelength $\lambda 01$ is sent from 16-CWDM de-multiplexer D; a second wavelength $\lambda 02$ is sent from 16-CWDM de-multiplexer C; a third wavelength $\lambda 03$ is sent from 16-CWDM de-multiplexer B; and a fourth wavelength $\lambda 04$ is sent from 16-CWDM de-multiplexer A to receiver 01. Because receiver 01 is receiving signals at different wavelengths at the same time, the signals do not interfere with one another if received at the same time. The same configuration is used at the other receivers.

Phase Conversion Examples

FIG. 7-FIG. 10 depict the configurations for different phases according to some embodiments. In each of the phases, the field size is configured once and unchanged through phases 1, 2, and 3. That is, the nodes, splitters, 8-DWDM de-multiplexer, and 16-CWDM multiplexer are not changed when a phase conversion occurs.

Figure 7:
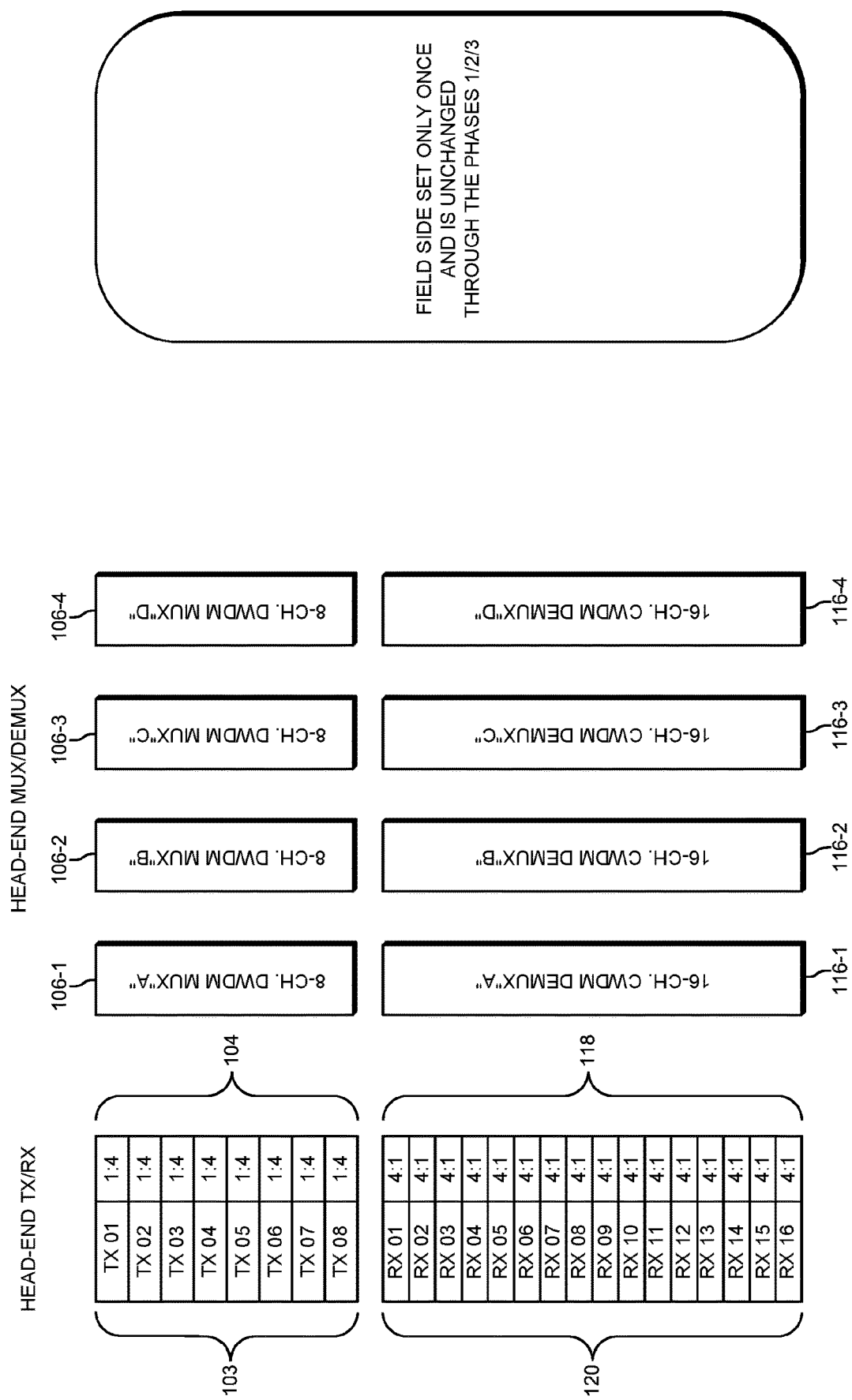
FIG. 7 depicts an example of a phase 1 configuration according to some embodiments.

The configuration of FIG. 7 is similar to the configuration described above in FIG. 1, but shows all the 8-DWDM multiplexers A, B, C, and D 106-1 to 106-4. In head end 102, eight transmitters 103 send signals to eight 1:4 splitters 104. Then, 8-DWDM multiplexers A, B, C, and D 106-1 to 106-4 each receive one of the four signals from each 1:4 splitter 104.

In the upstream direction, four 16-CWDM de-multiplexers A, B, C, and D 116-1 to 116-4 receive signals from four sets of 16 nodes A, B, C, and D. Sixteen 4:1 combiners 118 receive signals from the four de-multiplexers and output a single signal to 16 receivers 120 respectively.

Figure 8:
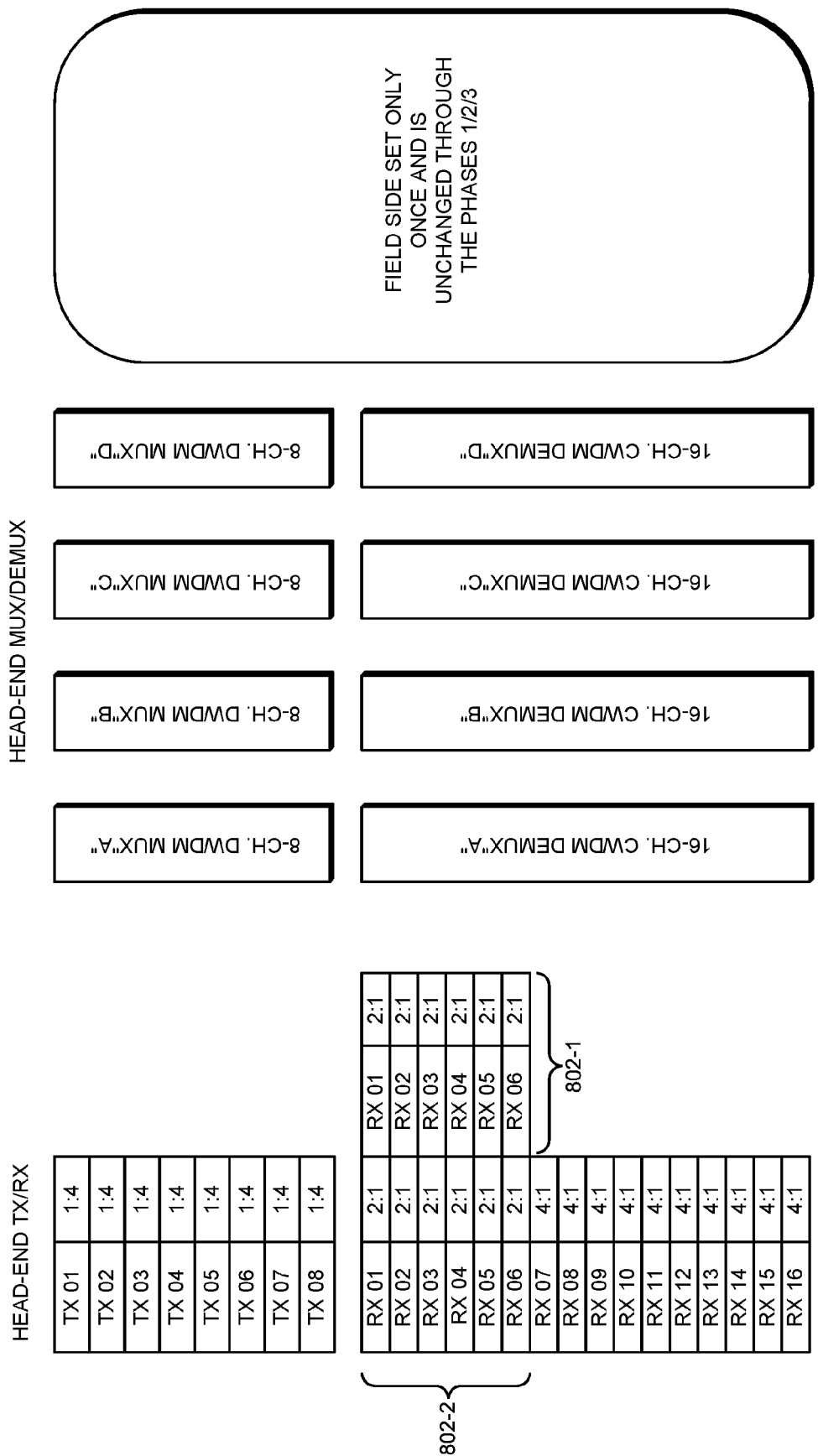
FIG. 8 depicts an example of a phase 1 alternative configuration according to some embodiments.

In the above configuration, the return receiver input level may be below a desired power level. To rectify this, receivers that are receiving an optical input that is below the desired power level threshold may be "doubled up"—e.g., instead of one 4:1 combiner being input into one receiver, two 2:1 combiners are input into two separate receivers. Optical levels input into receivers will be ~3 dB higher and the radio frequency (RF) outputs from those pairs of the receivers can then be RF combined, to preserve the right "phasing/service group sizing". FIG. 8 depicts such an arrangement on receivers RX 01 to RX 06 according to some embodiments.

At 802-1, receivers RX 01 to RX 06 are used in addition to 6 additional receivers RX 01 to RX 06 at 802-2. This increases the cost as the number of receivers increases. However, the power level may be increased because the combiners used for these two sets of receivers are 2:1 combiners. That is, each combiner receives two signals from two of the 16-CWDM de-multiplexers and outputs a single signal to a receiver. The loss at each of the 2:1 combiners may be less than the loss at 4:1 combiners, which increases the return receiver input level for these 12 receivers. The remaining combiners for receivers RX 08 to RX 16 are still 4:1 combiners.

Figure 9:
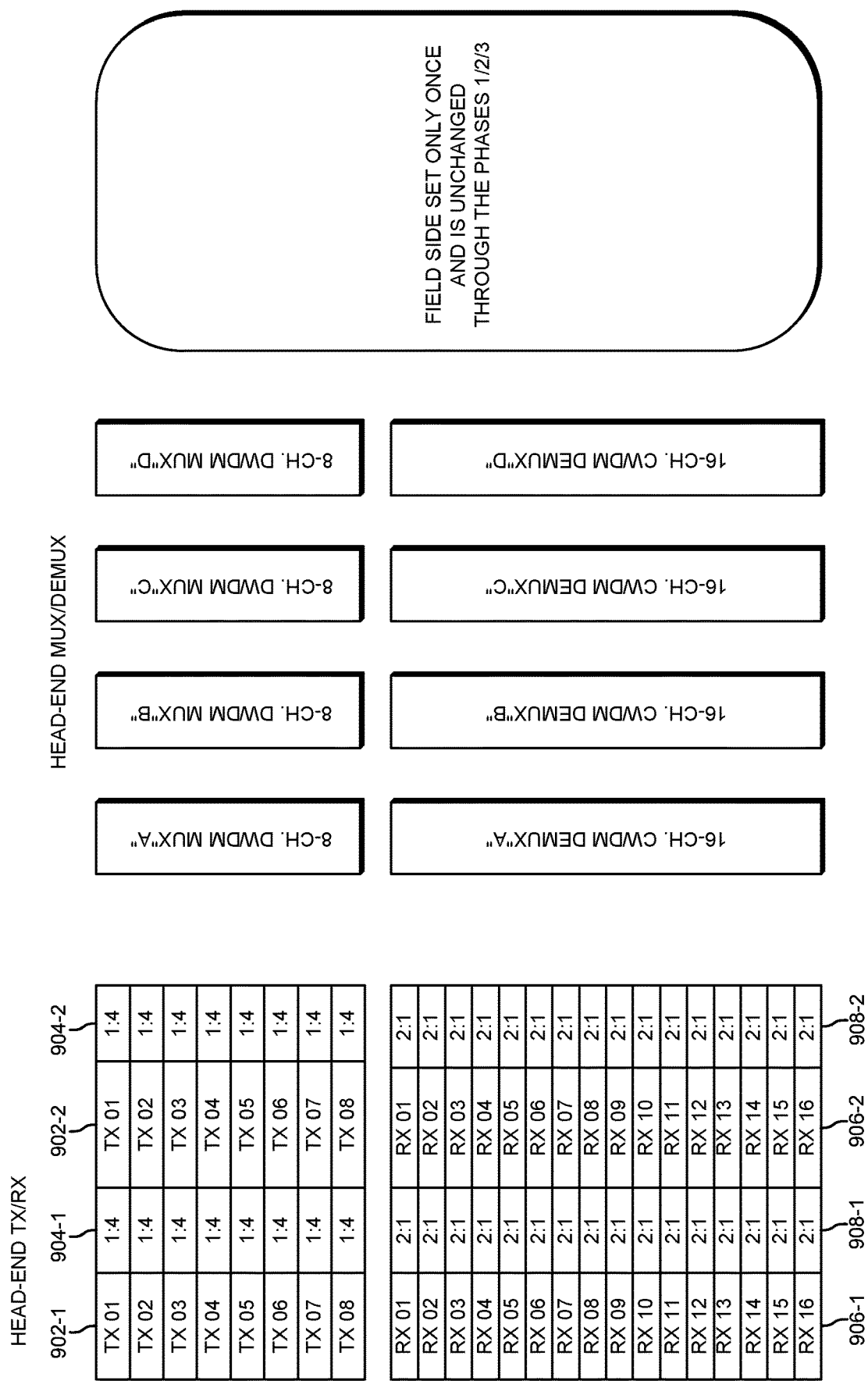
FIG. 9 depicts an example configuration for a phase 2 according to some embodiments.

FIG. 9 depicts an example configuration for a phase 2 according to some embodiments. In this example, one downstream transmitter feeds two of the downstream nodes and one upstream receiver receives signals from two of the downstream nodes. In the downstream direction, two sets of transmitters TX 01 to TX 08 at 902-1 and 902-2 are used. Each transmitter outputs a signal to a 1:2 splitter shown at 904-1 and 904-2. Each 1:2 splitter may split the signal into two signals, which are then sent to two 8-DWDM multiplexers. For example, a first transmitter TX 01 in 902-1 may send a signal for 8-DWDM multiplexers A and B, and a second transmitter TX 01 in 902-2 may send a signal for 8-DWDM multiplexers C and D.

In the upstream direction, receivers RX 01 to RX 16 are included in two sets shown at 906-1 and 906-2. Also, two sets of 2:1 combiners are then shown at 908-1 and 908-2. Each 2:1 combiner receives signals from two 16-CWDM de-multiplexers. For example, a first 2:1 combiner receives signals from 16-CWDM de-multiplexers A and B, and a second 2:1 combiner receives signals from 16-CWDM de-multiplexers C and D. Then, a first receiver RX 01 at 906-1 may receive signals from 16-CWDM de-multiplexers A and B, and a second receiver RX 01 at 906-2 may receive signals from 16-CWDM de-multiplexers C and D.

Figure 10:
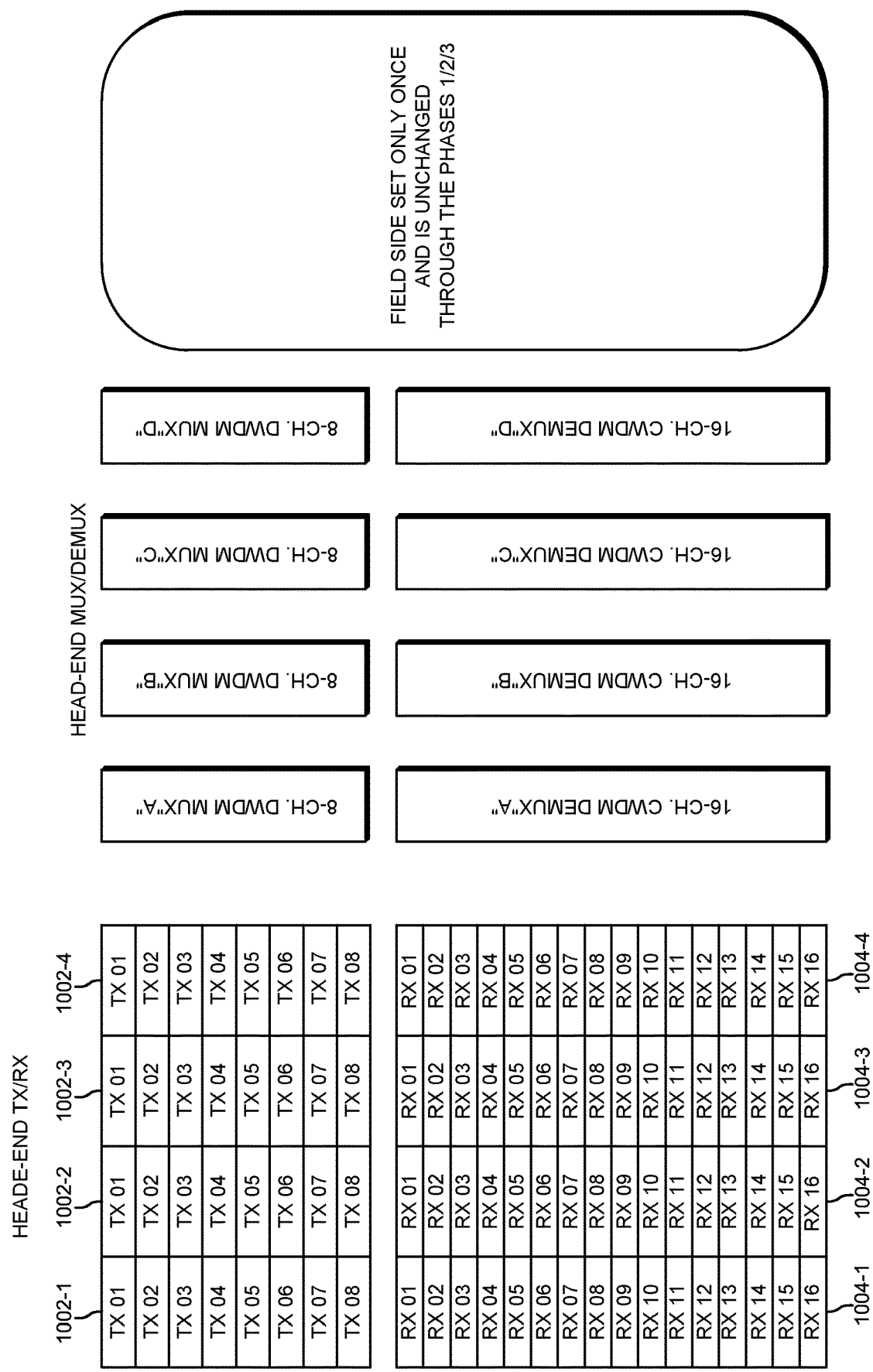
FIG. 10 depicts an example of the configuration in phase 3 according to some embodiments.

FIG. 10 depicts an example of the configuration in phase 3 according to some embodiments. In this example, one downstream transmitter feeds one de-multiplexer and one upstream receiver receives signals from one de-multiplexer. For example, four sets of transmitters are shown at 1002-1 to 1002-4. Each respective set of transmitters sends signals to a specific 8-DWDM multiplexer. For example, a first transmitter TX 01 at 1002-1 sends a signal to 8-DWDM multiplexer A; a second transmitter TX 01 at 1002-2 sends a signal to 8-DWDM multiplexer B; a third transmitter TX 01 at 1002-3 sends a signal to 8-DWDM multiplexer C; and a fourth transmitter TX 01 at 1002-4 sends a signal to 8-DWDM multiplexer D.

In the upstream direction, one receiver receives a signal from a single 16-CWDM de-multiplexer. For example, four sets of 16 receivers are shown at 1004-1 to 1004-4. A first receiver RX 01 at 1004-1 receives a signal from 16-CWDM de-multiplexer A; a second receiver RX 01 at 1004-2 receives a signal from 16-CWDM de-multiplexer B; a third receiver RX 01 at 1004-3 receives a signal from 16-CWDM de-multiplexer C; and a fourth receiver RX 01 at 1004-4 receives a signal from 16-CWDM de-multiplexer D.

Alternative Upstream Striping Configuration

Figure 11:
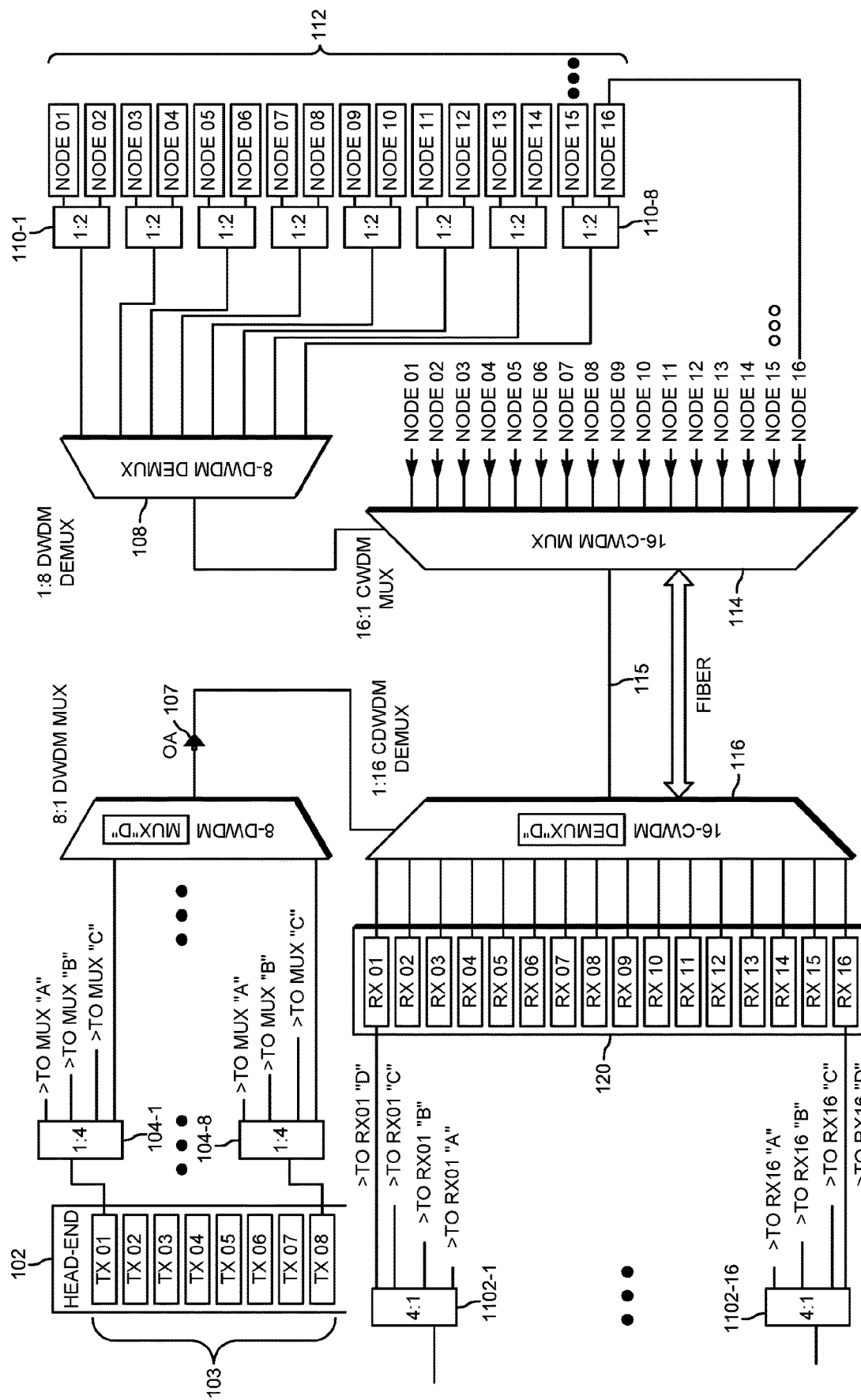
FIG. 11 depicts an alternative upstream striping configuration according to some embodiments.

FIG. 11 depicts an alternative upstream striping configuration according to some embodiments. In this example, a one FD node per receiver configuration is used in phase 1. Accordingly, four sets of 16 receivers RX 01 to RX 16 are associated with the four 16-CWDM de-multiplexers A, B, C, and D 116-1 to 116-4. Only 16-CWDM de-multiplexer D 116 is shown in this example, however. Different from the configuration shown in FIG. 1, additional receivers are required because the striping happens after the receivers using RF 4:1 combiners 1102-1 to 1102-16. For example, an RF 4:1 combiner 1102-1 receives signals from receivers RX 01 that are connected to 16-CWDM de-multiplexers A, B, C, and D, combines the signals, and outputs a single signal. The combining is performed in RF instead of optical because the receivers output RF.

The use of a single receiver for a single node eliminates the possibility of optical beat interference because multiple transmitters are not transmitting to a single receiver. Rather, only one node is transmitting to one receiver.

Splitter Configuration

Figure 12A:
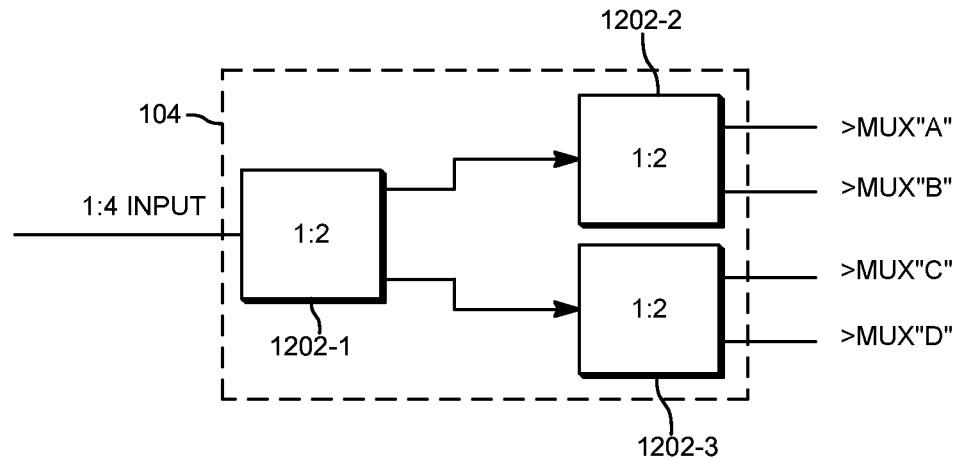
FIG. 12A shows an example of a 1:4 splitter according to some embodiments.
Figure 12B:
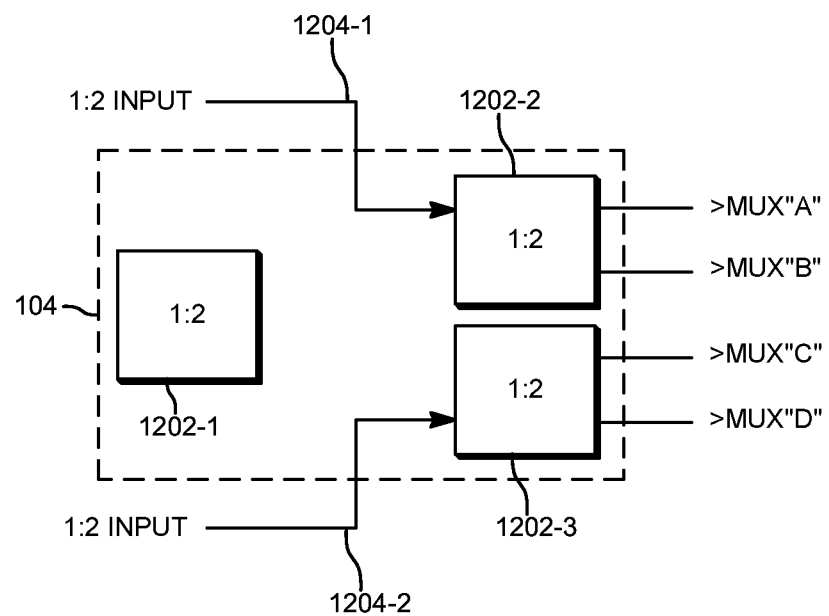
FIG. 12B shows an example of a splitter that can be converted from a 1:4 splitter to two 1:2 splitters according to some embodiments.

The above changes between phases may change the splitters used in the downstream direction at head end 102 (not in the field). That is, a 1:4 splitter may be changed to a 1:2 splitter when the phase 1 to phase 2 conversion occurs. This may cause total replacement of the 1:4 splitters. However, some embodiments use a 1:4 splitter that can be converted to two 1:2 splitters. FIGS. 12A and 12B depict the re-use of a 1:4 splitter according to some embodiments. Phase 1 requires a 1:4 splitter after the downstream transmitters. FIG. 12A shows an example of a 1:4 splitter according to some embodiments. Splitter 104 includes three 1:2 splitters 1202-1, 1202-2, and 1202-3 that are included in a single housing.

The configuration for the splitter 104 is one input and four outputs. For example, a 1:4 input is input into a 1:2 splitter 1202-1. 1:2 splitter 1202-1 then splits the input into two signals that are output to a 1:2 splitter 1202-2 and a 1:2 splitter 1202-3. Splitter 1202-2 splits the signal into two signals, which can be sent to an 8-DWDM multiplexer A and an 8-DWDM multiplexer B. A 1:2 splitter 1202-3 can split the signal into two signals and send the signals to an 8-DWDM multiplexer C and an 8-DWDM multiplexer D. Accordingly, the single input is split into four outputs.

FIG. 12B shows an example of a splitter that can be converted from a 1:4 splitter to two 1:2 splitters according to some embodiments. Phase 2 requires two 1:2 splitters after a transmitter. Instead of replacing a 1:4 splitter with two 1:2 splitters, the 1:4 splitter in FIG. 12A can be re-used by adding 2 inputs to the original 1:4 housing. The housing thus has three inputs and four outputs.

In FIG. 12B, the 1:4 input is not used in this example. Rather, a 1:2 input at 1204-1 and a 1:2 input at 1204-2 is used to receive inputs from two transmitters. At 1:2 input at 1204-1, splitter 1202-1 receives a signal from a transmitter, and splits the signal into two signals at the two outputs, which then sends a signal to 8-DWDM multiplexer A and a signal to 8-DWDM multiplexer B. At 1:2 input at 1204-2, splitter 1202-3 receives a signal from a transmitter, and splits the signal into two signals at the two outputs, which then sends a signal to 8-DWDM multiplexer C and a signal to 8-DWDM multiplexer D. In this example, the 1:4 input may be disconnected from 1:2 splitter 1202-1 and reconnected to 1:2 splitter 1202-2 at input 1204-1. Then, another input from another transmitter may be connected to 1:2 splitter 1202-3 at input 1204-2. In this case, 1:2 splitter 1202-1 and the corresponding input are not used.

The above configuration does not require a splitter to be replaced when the conversion between phases occurs. Rather, only the inputs need to be reconfigured. This may save cost as an additional splitter does not need to be purchased. To provide the reconfigurable splitter, two additional inputs may be added to the housing that can be input to splitters 1202-2 and 1202-3, respectively. It is noted that splitter 104 may operate at a 1:4 configuration or the 2:4 configuration. That is, two inputs are split into four outputs when converted to the two 1:2 splitters. Splitter 104 may include logic such that if three inputs are connected at the same time, such as the 1:4 input, the 1:2 input, and the other 1:2 input at the same time, splitter 104 may select either the 1:4 input or the two 1:2 inputs individually or either of them. That is, splitter 104 will not transmit signals from all three inputs simultaneously.

Figure 13A:
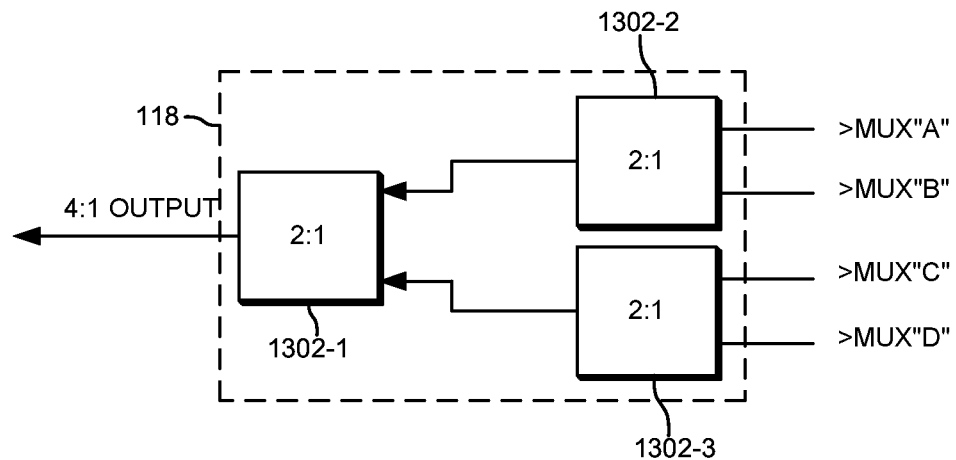
FIG. 13A shows a 4:1 combiner according to some embodiments.
Figure 13B:
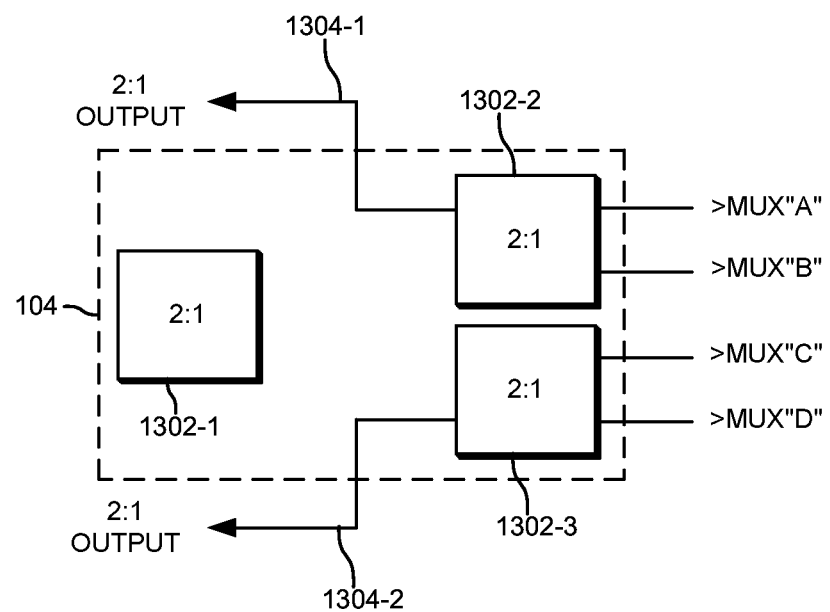
FIG. 13B depicts an example of converting a 4:1 combiner to two 2:1 combiners according to some embodiments.

In the upstream direction, the configuration of combiner 118 may be converted to two 2:1 combiners between a phase conversion. For example, the four inputs of a 4:1 combiner may receive signals from 16-CWDM de-multiplexers A, B, C, and D. When a 4:1 combiner is used, a single output from combiner 104 may be used. However, when a 2:1 combiner is used, then the 4:1 combiner may use two outputs to provide two 2:1 combiners. FIGS. 13A and 13B show the 4:1 re-usable combiner according to some embodiments. FIG. 13A shows a 4:1 combiner 118 according to some embodiments. A 4:1 combiner includes 2:1 combiners 1302-1, 1302-2, and 1302-3 in a single housing.

Combiner 118 includes four inputs from four 16-CWDM de-multiplexers A, B, C, and D. Two of the inputs from 16-CWDM de-multiplexers A and B are input into a 2:1 combiner 1302-2 and two inputs from 16-CWDM de-multiplexers C and D are input into a 2:1 combiner 1302-3. Combiner 1302-2 and combiner 1302-3 combine the respective signals and each output a single signal that is input into a 2:1 combiner 1302-1. Combiner 1302-1 combines the signals and then outputs a single signal at a 4:1 output that is sent to a single receiver.

FIG. 13B depicts an example of converting a 4:1 combiner to two 2:1 combiners according to some embodiments. In this example, instead of using a single 4:1 output from 2:1 combiner 1302-1, two outputs from combiners 1302-2 and 1302-3 are used. For example, 2:1 combiner 1302-2 receives signals from 16-CWDM de-multiplexers A and B; and 2:1 combiner 1302-3 receives signals from 16-CWDM de-multiplexers C and D. Each 2:1 combiner combines the respective signals, and outputs a single signal. For example, 2:1 combiner 1302-2 outputs a 2:1 output at an output 1304-1 and combiner 1302-3 outputs a 2:1 output at output 1304-2. It is noted that combiner 118 may operate at a 4:1 configuration or the 4:2 configuration. That is, four inputs are combined into two inputs when converted to the two 2:1 combiners. Combiner 118 may include logic such that if three outputs are connected at the same time, such as the 4:1 output, the 2:1 output, and the other 2:1 output at the same time, splitter 104 may select either the 4:1 output or the two 2:1 outputs. That is, splitter 104 will not transmit signals from all three inputs simultaneously.

Because each 2:1 combiner 1302-1 and 1302-2 outputs a single output at 1304-1 and 1304-2, respectively, 2:1 combiner 1302-1 are the 4:1 output are not used to output a signal in FIG. 12B. Accordingly, a 4:1 combiner has been converted to two 2:1 combiners. Instead of replacing the 4:1 combiners with two 2:1 combiners, the same 4:1 combiner may be used as two 2:1 combiners. This saves costs as only outputs need to be reconfigured rather than the replacement of the combiners.

Method Flows

Figure 14:
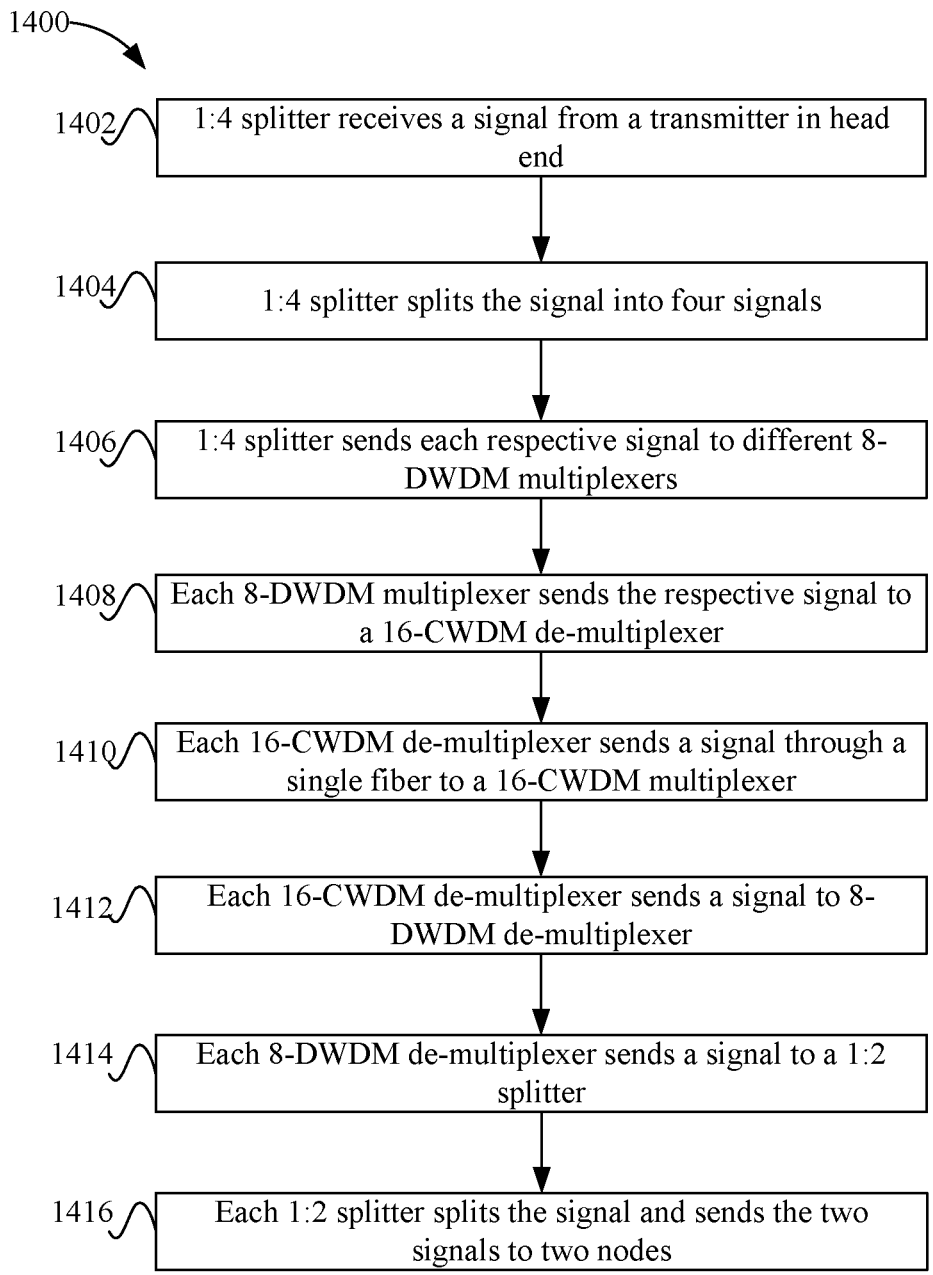
FIG. 14 depicts a simplified flowchart of a method for striping according to some embodiments.

FIG. 14 depicts a simplified flowchart 1400 of a method for striping according to some embodiments. At 1402, 1:4 splitter 104 receives a signal from a transmitter in head end 102. At 1404, 1:4 splitter 104 splits the signal into four signals. Then, at 1406, 1:4 splitter sends each respective signal to different 8-DWDM multiplexers.

At 1408, each 8-DWDM multiplexer 106 sends the respective signal to a 16-CWDM de-multiplexer 116. At 1410, each 16-CWDM de-multiplexer 114 sends a signal through a single fiber to a 16-CWDM multiplexer 114. At 1412, each 16-CWDM de-multiplexer 114 sends a signal to 8-DWDM de-multiplexer 108. At 1414, each 8-DWDM de-multiplexer 108 sends a signal to a 1:2 splitter 110-1. At 1416, each 1:2 splitter 110 splits the signal and sends the two signals to two nodes 112.

The upstream direction goes from nodes 112 to 16-CWDM de-multiplexer 114 to fiber connection 115. Then, 16-CWDM de-multiplexer 116 sends the signal to optical combiner 118, which receives the signals from four 16-CWDM de-multiplexers 116, and combines them. A receiver 120 receives the combined signal.

Conclusion

Accordingly, the use of striping may allow the configuration of the field components once and not need any reconfiguration thereafter as the configuration of head end 102 is changed. This saves costs as the field does not have to be reconfigured. Additional cost savings may be provided by using a splitter and combiner in the head end that can be converted from a 1:4 splitter to a 1:2 splitter and from a 4:1 combiner to 2 1:2 combiners.

System

Figure 15:
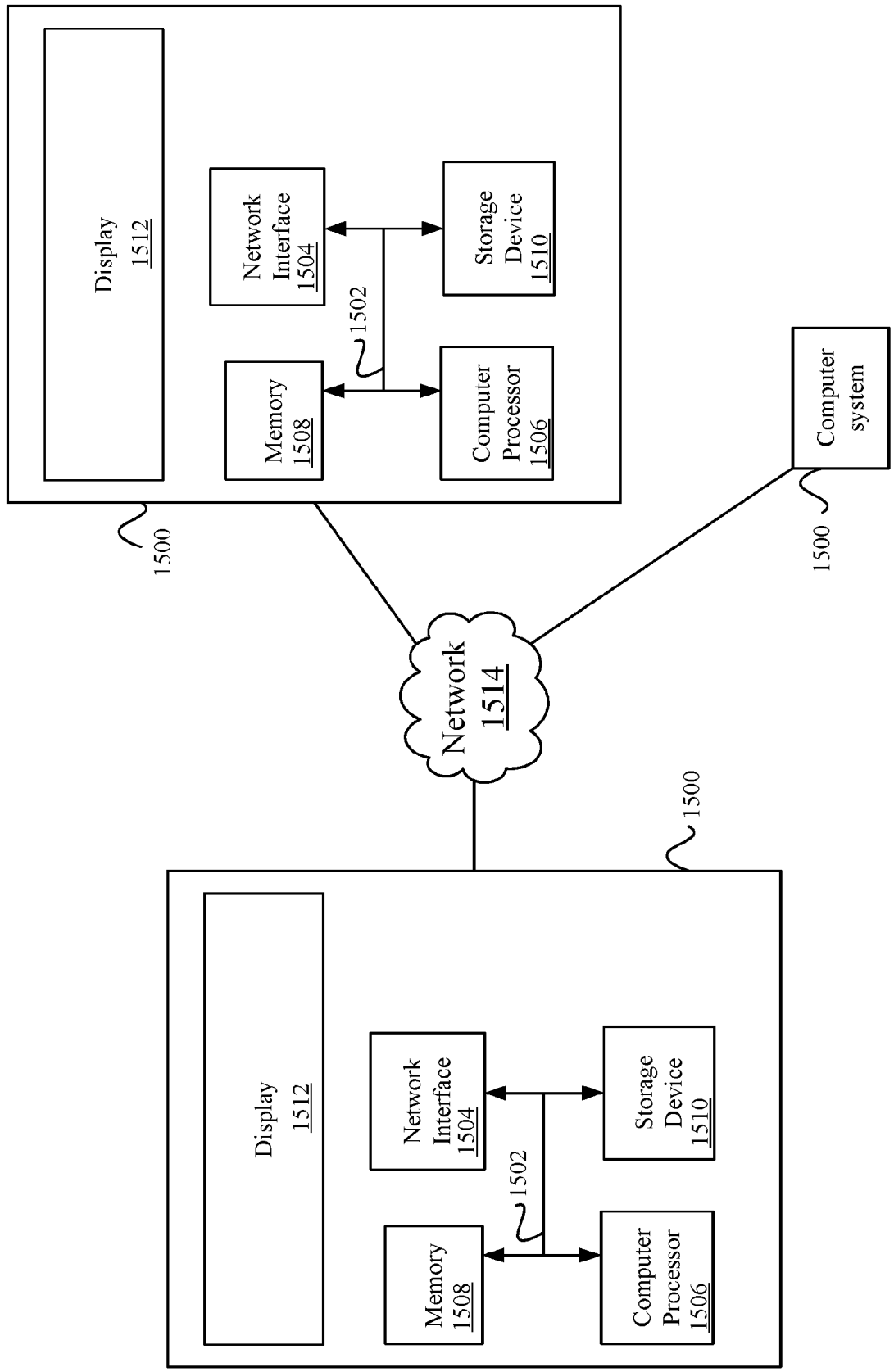
FIG. 15 illustrates an example of special purpose computer systems configured with components in the network described above according to one embodiment.

FIG. 15 illustrates an example of special purpose computer systems 1500 configured with components in the network described above according to one embodiment. Computer system 1500 includes a bus 1502, network interface 1504, a computer processor 1506, a memory 1508, a storage device 1510, and a display 1512.

Bus 1502 may be a communication mechanism for communicating information. Computer processor 1506 may execute computer programs stored in memory 1508 or storage device 1508. Any suitable programming language can be used to implement the routines of some embodiments including C, C++, Java, assembly language, etc. Different programming techniques can be employed such as procedural or object oriented. The routines can execute on a single computer system 1500 or multiple computer systems 1500. Further, multiple computer processors 1506 may be used.

Memory 1508 may store instructions, such as source code or binary code, for performing the techniques described above. Memory 1508 may also be used for storing variables or other intermediate information during execution of instructions to be executed by processor 1506. Examples of memory 1508 include random access memory (RAM), read only memory (ROM), or both.

Storage device 1510 may also store instructions, such as source code or binary code, for performing the techniques described above. Storage device 1510 may additionally store data used and manipulated by computer processor 1506. For example, storage device 1510 may be a database that is accessed by computer system 1500. Other examples of storage device 1510 include random access memory (RAM), read only memory (ROM), a hard drive, a magnetic disk, an optical disk, a CD-ROM, a DVD, a flash memory, a USB memory card, or any other medium from which a computer can read.

Memory 1508 or storage device 1510 may be an example of a non-transitory computer-readable storage medium for use by or in connection with computer system 1500. The non-transitory computer-readable storage medium contains instructions for controlling a computer system 1500 to be configured to perform functions described by some embodiments. The instructions, when executed by one or more computer processors 1506, may be configured to perform that which is described in some embodiments.

Computer system 1500 includes a display 1512 for displaying information to a computer user. Display 1512 may display a user interface used by a user to interact with computer system 1500.

Computer system 1500 also includes a network interface 1504 to provide data communication connection over a network, such as a local area network (LAN) or wide area network (WAN). Wireless networks may also be used. In any such implementation, network interface 1504 sends and receives electrical, electromagnetic, or optical signals that carry digital data streams representing various types of information.

Computer system 1500 can send and receive information through network interface 1504 across a network 1514, which may be an Intranet or the Internet. Computer system 1500 may interact with other computer systems 1500 through network 1514. In some examples, client-server communications occur through network 1514. Also, implementations of some embodiments may be distributed across computer systems 1500 through network 1514.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A system comprising:
a first group of splitters configured to receive a group of signals from a group of transmitters, wherein each splitter in the first group of splitters is configured to split a band-limited signal into a plurality of signals that are sent to a plurality of wavelength division multiplexers, the band-limited signal split by each splitter spanning a frequency range different than that of the other splitters in the first group of splitters; and
a multiplexer in the plurality of wavelength division multiplexers configured to receive one of the plurality of signals from each splitter in the first group of splitters and multiplex the received one of the plurality of signals into a multiplexed signal, wherein:
the multiplexer is configured to send the multiplexed signal through a single connection in which upstream signals are received from a group of nodes and downstream signals are sent to the group of nodes, and
a de-multiplexer de-multiplexes the multiplexed signal into the group of signals and sends the group of signals to the group of nodes via a second group of splitters that are connected to the group of nodes.

2. The system of claim 1, wherein the de-multiplexer comprises a first de-multiplexer and the multiplexer comprises a first multiplexer, the system further comprising a second de-multiplexer that receives the multiplexed signal from the first multiplexer and sends the multiplexed signal to a second multiplexer.

3. The system of claim 2, wherein the second multiplexer receives a plurality of upstream signals from the group of nodes, multiplexes the plurality of upstream signals into a multiplexed upstream signal.

4. The system of claim 3, wherein the second de-multiplexer receives the multiplexed upstream signal and de-multiplexes the multiplexed upstream signal into the plurality of upstream signals.

5. The system of claim 4, further comprising a group of combiners configured to receive the plurality of upstream signals, wherein each combiner receives an upstream signal from each of a plurality of second de-multiplexers, combines the upstream signals, and outputs a combined signal to a receiver.

6. The system of claim 4, further comprising a group of receivers configured to receive the plurality of upstream signals and a plurality of combiners, wherein each combiner receives an upstream signal from each of a group of receivers, combines the upstream signals, and outputs a combined signal.

7. The system of claim 1, wherein the second group of splitters are configured in a single level of splitters between the de-multiplexer and the group of nodes.

8. The system of claim 1, wherein a splitter in the first group of splitters is a 1:4 splitter includes a first input that receives a signal from a transmitter and splits the signal using a first 1:2 splitter, a second 1:2 splitter, and a third 1:2 splitter in a single housing.

9. The system of claim 8, wherein the first 1:2 splitter splits the signal into two second signals, the second 1:2 splitter receives a first of the two second signals and splits the first of the two second signals into two third signals, and the third 1:2 splitter receives a second of the two second signals and splits the second of the two second signals into two fourth signals.

10. The system of claim 8, wherein the single housing includes a second input to receive a first signal from a first transmitter and a third input to receive a second signal from a second transmitter, the second 1:2 splitter receives the first signal and splits the first signal into two second signals the third 1:2 splitter receives the first signal and splits the first signal into two second signals, and the first 1:2 splitter is not used.

11. The system of claim 1, further comprising a plurality of combiners configured to receive a plurality of upstream signals, wherein the combiner is a 4:1 combiner that includes a first input that receives an upstream signal from a plurality of groups of nodes and combines the upstream signal from the plurality of groups of nodes using a first 2:1 combiner, a second 2:1 combiner, and a third 2:1 combiner that are located in a single housing.

12. The system of claim 11, wherein, the first 2:1 combiner combines two of the signals into a second signal, the second 2:1 combiner combines two of the signals into a third signal, and the third 2:1 combiner combines the second signal and the third signal into a fourth signal.

13. The system of claim 12, wherein the single housing includes a second output and a third output, the second 2:1 combiner outputs the second signal on the second output, the third 2:1 combiner outputs the third signal on the third output, and the first 2:1 combiner is not used.

14. The system of claim 1, further comprising:
a plurality of combiners configured to receive a plurality of upstream signals, wherein the combiner is a 4:1 combiner that includes a first input that receives an upstream signal from a plurality of groups of nodes and combines the upstream signal from the plurality of groups of nodes using a first 2:1 combiner, a second 2:1 combiner, and a third 2:1 combiner that are located in a single housing.

15. The system of claim 14, wherein:
the first 2:1 combiner combines two of the signals into a second signal;
the second 2:1 combiner combines two of the signals into a third signal; and
the third 2:1 combiner combines the second signal and the third signal into a fourth signal.

16. The system of claim 15, wherein:
the signal housing includes a second output and a third output,
the second 2:1 combiner outputs the second signal on the second output,
the third 2:1 combiner outputs the third signal on the third output, and
the first 2:1 combiner is not used.

17. A method comprising:
receiving, at a first group of splitters, a group of signals from a group of transmitters, wherein each splitter in the first group of splitters is configured to split a band-limited signal into a plurality of signals that are sent to a plurality of wavelength division multiplexers, the band-limited signal split by each splitter spanning a frequency range different than that of the other splitters in the first group of splitters; and
receiving, at a multiplexer in the plurality of wavelength division multiplexers, one of the plurality of signals from each splitter in the first group of splitters and multiplex the received one of the plurality of signals into a multiplexed signal, wherein:
the multiplexer sends the multiplexed signal through a single connection in which upstream signals are received from a group of nodes and downstream signals are sent to the group of nodes, and
a de-multiplexer de-multiplexes the multiplexed signal into the group of signals and sends the group of signals to the group of nodes via a second group of splitters that are connected to the group of nodes.

18. A system comprising:
a first group of splitters configured to receive a group of signals from a group of transmitters, wherein each splitter in the first group of splitters is configured to split a band-limited signal into a plurality of signals that are sent to a plurality of wavelength-division multiplexers, the band-limited signal split by each splitter spanning a frequency range different than that of the other splitters in the first group of splitters;
a first multiplexer in the plurality of wavelength division multiplexers configured to receive one of the plurality of signals from each splitter in the first group of splitters and multiplex the received one of the plurality of signals into a multiplexed signal;
a first de-multiplexer configured to receive the multiplexed signal and send the multiplexed signal through a single connection in which upstream signals are received from a group of nodes and downstream signals are sent to the group of nodes;
a second multiplexer configured to receive the multiplexed signal;
a second de-multiplexer configured to de-multiplex the multiplexed signal into the group of signals; and
a second group of splitters that receive the group of signals and split the group of signals for the group of nodes.

19. A method comprising:
receiving, at a first group of splitters, a group of signals from a group of transmitters, wherein each splitter in the first group of splitters is configured to split a signal into a plurality of signals that are sent to a plurality of multiplexers; and
receiving, at a multiplexer in the plurality of multiplexers, one of the plurality of signals from each splitter in the first group of splitters and multiplex the received one of the plurality of signals into a multiplexed signal, wherein:
the multiplexer sends the multiplexed signal through a single connection in which upstream signals are received from a group of nodes and downstream signals are sent to the group of nodes, and
a de-multiplexer de-multiplexes the multiplexed signal into the group of signals and sends the group of signals to the group of nodes via a second group of splitters that are connected to the group of nodes.

20. A system comprising:
a first group of splitters configured to receive a group of signals from a group of transmitters, wherein each splitter in the first group of splitters is configured to split a signal into a plurality of signals that are sent to a plurality of wavelength division multiplexers;
a first multiplexer in the plurality of wavelength division multiplexers configured to receive one of the plurality of signals from each splitter in the first group of splitters and multiplex the received one of the plurality of signals into a multiplexed signal;
a first de-multiplexer configured to receive the multiplexed signal and send the multiplexed signal through a single connection in which upstream signals are received from a group of nodes and downstream signals are sent to the group of nodes;
a second multiplexer configured to receive the multiplexed signal;
a second de-multiplexer configured to de-multiplex the multiplexed signal into the group of signals; and
a second group of splitters that receive the group of signals and split the group of signals for the group of nodes.

* * * * *